United States Patent
Ostrowski et al.

(10) Patent No.: US 7,800,920 B2
(45) Date of Patent: Sep. 21, 2010

(54) SUPPORT AND EXTENSION RAIL ASSEMBLY

(75) Inventors: Frankie K. Ostrowski, Natrona Heights, PA (US); Raymond P. Gundy, II, Indiana, PA (US); Aaron T. Kozar, Zelienople, PA (US); David M. Olszewski, Coraopolis, PA (US)

(73) Assignee: Eaton Corporation, Cleveland, OH (US)

( * ) Notice: Subject to any disclaimer, the term of this patent is extended or adjusted under 35 U.S.C. 154(b) by 774 days.

(21) Appl. No.: 11/736,746

(22) Filed: Apr. 18, 2007

(65) Prior Publication Data

US 2008/0259584 A1 Oct. 23, 2008

(51) Int. Cl.
 *H05K 7/14* (2006.01)
(52) U.S. Cl. ................. 361/807; 361/810; 361/741; 211/26
(58) Field of Classification Search ................. 361/741, 361/756, 802, 796, 788; 211/26
See application file for complete search history.

(56) References Cited

U.S. PATENT DOCUMENTS

| | | | |
|---|---|---|---|
| 4,002,864 A | 1/1977 | Kuhn et al. | |
| 4,004,113 A | 1/1977 | Ericson et al. | |
| 4,486,814 A | 12/1984 | Ishikawa et al. | |
| 6,070,742 A * | 6/2000 | McAnally et al. | 211/26 |
| 6,242,534 B1 * | 6/2001 | Obrecht et al. | 525/191 |
| 6,381,149 B1 * | 4/2002 | Megason et al. | 361/801 |
| 6,547,081 B1 * | 4/2003 | Kaminski | 211/26 |
| 6,554,142 B2 * | 4/2003 | Gray | 211/26 |
| 6,588,866 B2 * | 7/2003 | Cheng | 312/334.7 |
| 6,600,648 B2 * | 7/2003 | Curlee et al. | 361/679.34 |
| 6,601,713 B2 * | 8/2003 | Kaminski | 211/26 |
| 6,735,091 B2 * | 5/2004 | Megason et al. | 361/801 |
| 7,324,349 B2 * | 1/2008 | Wobig et al. | 361/756 |

\* cited by examiner

*Primary Examiner*—Dameon E Levi
(74) *Attorney, Agent, or Firm*—Martin J. Moran

(57) ABSTRACT

A housing assembly and a support rail and extension rail assembly for an electrical switching apparatus includes various components. The support rail assembly is, preferably, a cast plate-like body wherein selected components, such as a levering in mechanism lug and support rails are formed as part of the casting. The extension rail assembly includes a generally flat, elongated body having a finger notch that is sized to accommodate a gloved hand and a mounting slot. The extension rail assembly is coupled to the support rail assembly by a pivotal mounting that extends through the mounting slot. The extension rail further includes a lateral extension. The housing assembly includes an L-shaped cutout having a horizontal portion and a descending vertical portion. When the extension rail is in a storage, or first, position, the lateral extension is disposed in the L-shaped cutout.

8 Claims, 5 Drawing Sheets

SUPPORT AND EXTENSION RAIL ASSEMBLY

BACKGROUND OF THE INVENTION

1. Field of the Invention

This invention relates to a housing assembly for an electrical switching apparatus and, more specifically, to an extension rail assembly for an electrical switching apparatus housing assembly.

2. Background Information

An electrical switching apparatus is typically disposed in a housing assembly. The housing assembly is, typically, a rectangular box having a back sidewall, a top sidewall, a bottom sidewall, a right sidewall, a left sidewall, and a front sidewall. Selected sidewalls, typically the back sidewall or the top and bottom sidewalls, have openings therethrough which are structured to accommodate the line and load conductors for the electrical switching apparatus. The front sidewall may be movable, or removable, so as to allow access to the enclosed space defined by the housing assembly. An electrical switching apparatus may be disposed in the enclosed space defined by the housing assembly and coupled to the line and load conductors.

Certain types of electrical switching apparatus have a considerable weight. Further, certain types of electrical switching apparatus, such as, but not limited to, a circuit breaker having a high interruption capability, are known to experience high loads during operation. These loads are transferred to the housing assembly. To support the electrical switching apparatus and to assist in transferring loads from the electrical switching apparatus to the housing assembly, a typical housing assembly includes a pair of support rails. That is, a typical electrical switching apparatus includes a plurality of wheels structured to travel over, or within, a defined track. The track is often a pair of generally parallel support rails.

Support rails for an electrical switching apparatus housing assembly may be disposed upon the bottom sidewall or on a frame assembly disposed within the housing assembly but, preferably, the support rails are coupled to the right and left sidewalls. Such rails are typically coupled to the sidewalls by a plurality of fasteners such as, but not limited to, nuts and bolts or by a coupling method such as welding. The support rails typically include a thin metal plate that is oriented with a thin edge disposed as the uppermost surface. The electrical switching apparatus plurality of wheels are structured to travel over the support rail uppermost surface.

The support rails are structured to support the electrical switching apparatus within the housing assembly. Many electrical switching apparatus housing assemblies also include a pair of rail extensions that may be extended from the housing assembly. The rail extensions are aligned with the support rails and allow the electrical switching apparatus to be pulled from the housing assembly. That is, the rail extensions are also thin metal plates that are oriented with a thin edge disposed as the uppermost surface. A rail extension is disposed immediately in front of a support rail and aligned therewith. In this configuration, the electrical switching apparatus may be rolled from the support rails onto the rail extensions which are disposed, generally, outside of the housing assembly. Thus, the electrical switching apparatus is supported outside of the housing assembly and may have maintenance performed thereon, or, if the electrical switching apparatus is being replaced, the electrical switching apparatus may be transferred from the rail extensions to a cart or similar device for transportation.

Rail extensions may be incorporated into the housing assembly support rail assembly, may be separate components, or may be incorporated into a cart or other transportation device. While not incorporating rail extensions into each housing assembly does reduce the cost of a housing assembly, this configuration may result in the rail extension not being available when needed. Thus, having rail extensions incorporated into each housing assembly support rail assembly has advantages. However, present support rail/rail extension assemblies have several disadvantages.

For example, as noted above, support rails are typically coupled to the housing assembly by a plurality of fasteners or other more permanent coupling means. Such coupling structures are not efficient for transferring loads from the electrical switching apparatus to the housing assembly and, typically, require the use of additional support plates. Further, present support rail/rail extension assemblies are generally a grouping of separate components. That is, there is a support rail assembly within the housing assembly and a mounting disposed adjacent thereto. The rail extensions are coupled to the mounting. Each of these components is separately installed. Such components are typically coupled to the housing assembly and include various latches and releases, many with spring loaded elements, structured to maintain the extended rails in the storage configuration and/or the use configuration. Such mechanisms are difficult to actuate when users are wearing protective gloves.

Further, the housing assembly typically includes various features or components which must each be individually installed and maintained. For example, a housing assembly may include a separate alignment device structured to align the electrical switching apparatus terminals with the housing assembly bus assembly, a separate interface for a levering in mechanism, and a separate lockout device. A levering in mechanism interface is typically a very rigid contact point to which the levering in mechanism is coupled to and applies forces against. A lockout device is a safety device wherein a lock, such as, but not limited to, a padlock is locked to the housing assembly and thereby prevents the use of the electrical switching apparatus or the housing assembly. Such separate components could be incorporated into a single support rail assembly.

There is, therefore, a need for a support and extension rail assembly for an electrical switching apparatus housing assembly that provides a mounting for the extension rails.

There is a further need for a support and extension rail assembly for an electrical switching apparatus housing assembly that assists in the transfer of loads to the housing assembly.

There is a further need for a support and extension rail assembly for an electrical switching apparatus housing assembly that assist in the alignment of the primary and secondary bus terminals of the electrical switching apparatus.

There is a further need for a support and extension rail assembly for an electrical switching apparatus housing assembly that provides a levering in mechanism interface.

There is a further need for a support and extension rail assembly for an electrical switching apparatus housing assembly that incorporates a lockout device.

There is a further need for a support and extension rail assembly for an electrical switching apparatus housing assembly that incorporates a simplified latch.

There is a further need for a support and extension rail assembly for an electrical switching apparatus housing assembly that may be actuated by a user wearing protective equipment including, but not limited to, electrical gloves.

SUMMARY OF THE INVENTION

These needs, and others, are met by at least one embodiment of the present invention which provides a housing assembly and a support rail and extension rail assembly for an electrical switching apparatus. Various components which, in the prior art, were separated have been incorporated into a reduced number of components. The support rail assembly is, preferably, a cast plate-like body wherein selected components, such as the levering in mechanism lug and support rails are formed as part of the casting. The extension rail assembly includes a generally flat, elongated body having a finger notch that is sized to accommodate a gloved hand and a mounting slot. The extension rail assembly is coupled to the support rail assembly by a pivotal mounting that extends through the mounting slot. The extension rail further includes a lateral extension. The housing assembly includes an L-shaped cutout having a horizontal portion and a descending vertical portion. The descending vertical portion of the L-shaped cutout is generally vertically aligned with the pivotal mounting.

In this configuration, the extension rail may be moved between three positions, a first position, an intermediate position, and a second position. In the first position, the extension rail body extends generally vertically with the lateral extension disposed at the lower end of the L-shaped cutout vertical portion. In the intermediate position, the extension rail body has been moved generally vertically and the lateral extension is now disposed at the vertex of the L-shaped cutout. From this position, the extension rail body may be pivoted into the second, horizontal position as the lateral extension passes through the L-shaped cutout horizontal portion and forward beyond the housing assembly sidewall. The extension rail body in the horizontal position abuts the support rail assembly body.

The support rail assembly body further includes protrusions on the exterior surface that are structured to be disposed in openings with a corresponding shape in the housing assembly. The protrusions are, preferably, cast as part of the support rail assembly body. The protrusions have a cross-sectional area that is larger than, for example, a bolt or screw. As such, the protrusions more effectively transfer loads from the electrical device supported by the rails to the housing assembly.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, directional words and phrases, such as, but not limited to, "upper," lower," "interior," and "exterior" relate to a housing assembly as shown in the figures. For example, a plate disposed entirely with the housing assembly may have an "exterior surface" which is the surface that is closest to the outside of the housing assembly.

As used herein, the word "unitary" means a component created as a single piece or unit. That is, a component that includes pieces that are created separately and then coupled together as a unit is not a "unitary" component or body.

Figure 1:
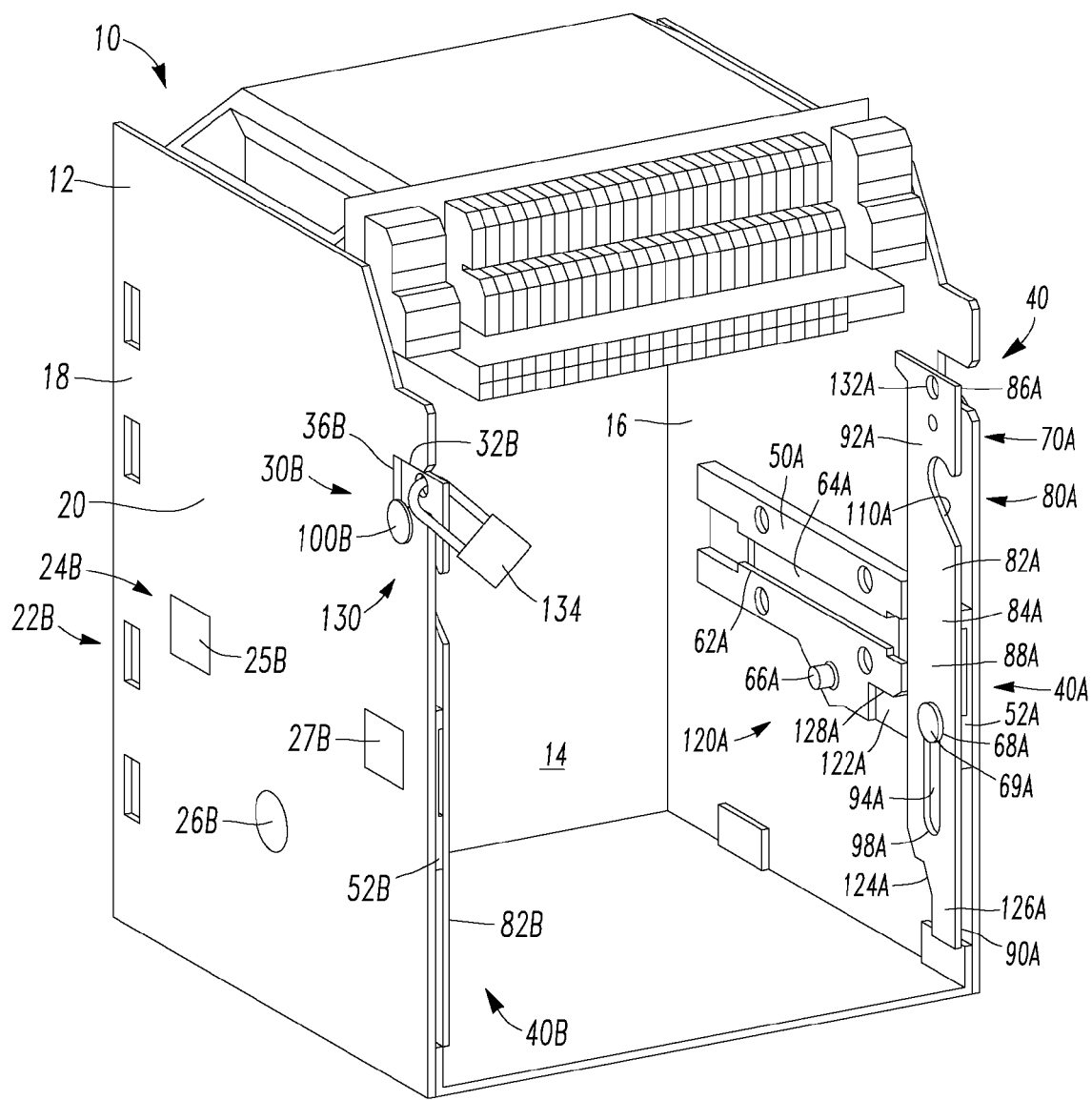
FIG. 1 is an isometric view of a housing assembly with the extension rails in a first position.
Figure 2:
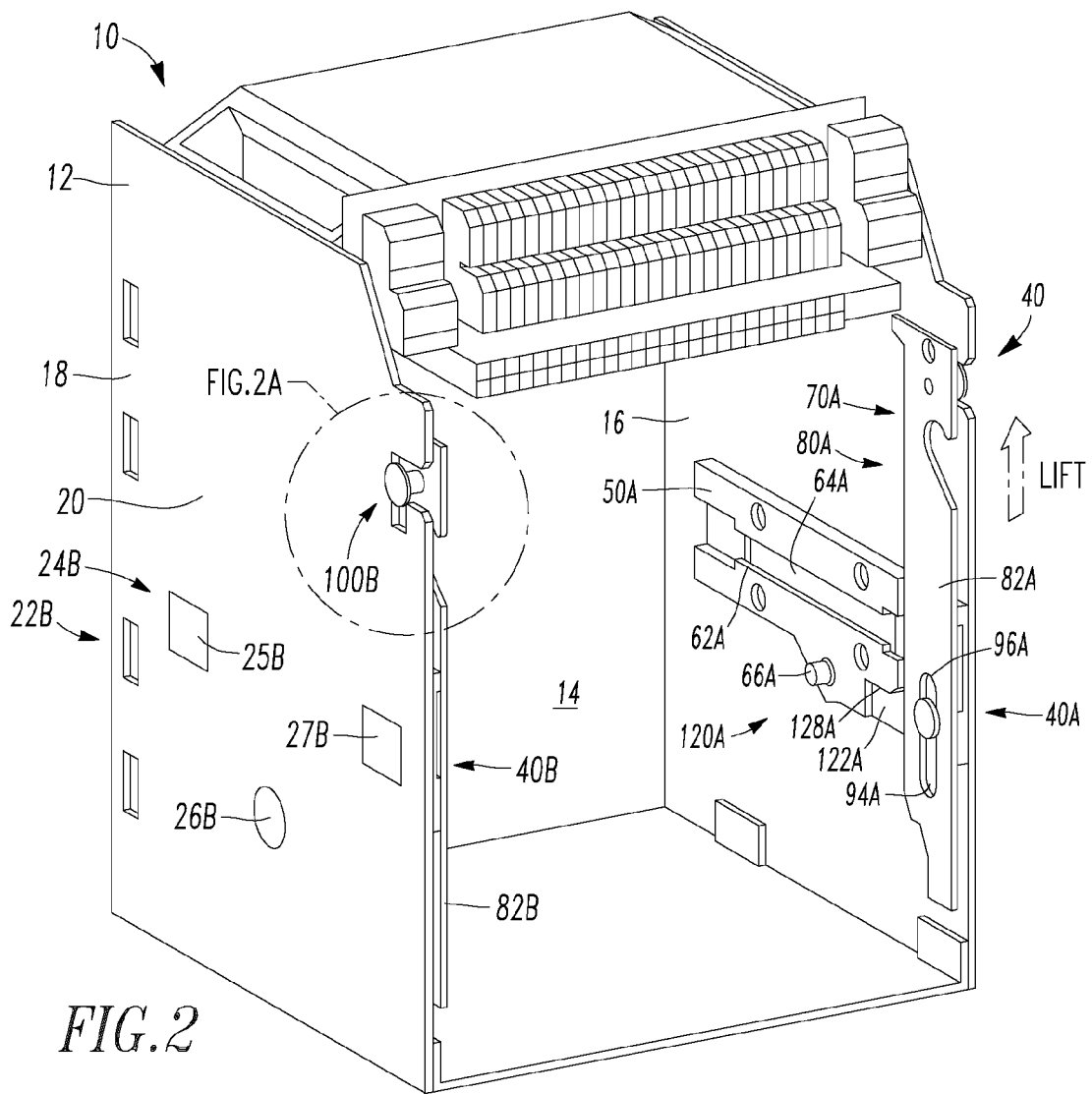
FIG. 2 is an isometric view of a housing assembly with the extension rails in an intermediate position.
Figure 2A:
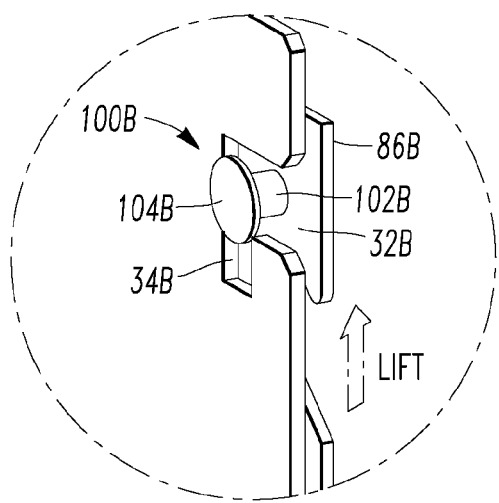
FIG. 2A is a detail of the lateral extension.
Figure 3:
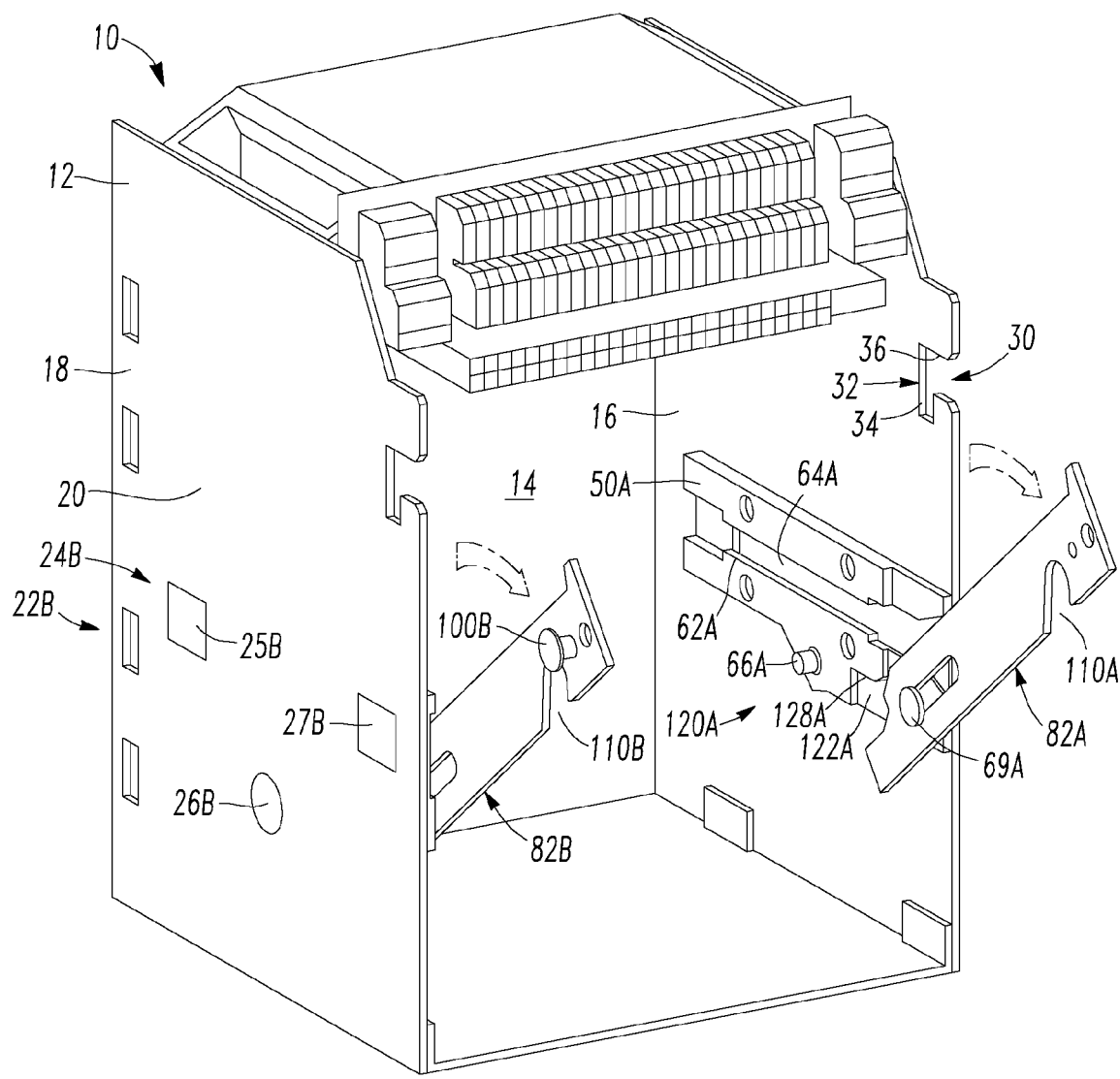
FIG. 3 is an isometric view of a housing assembly with the extension rail traveling toward a second position.
Figure 4:
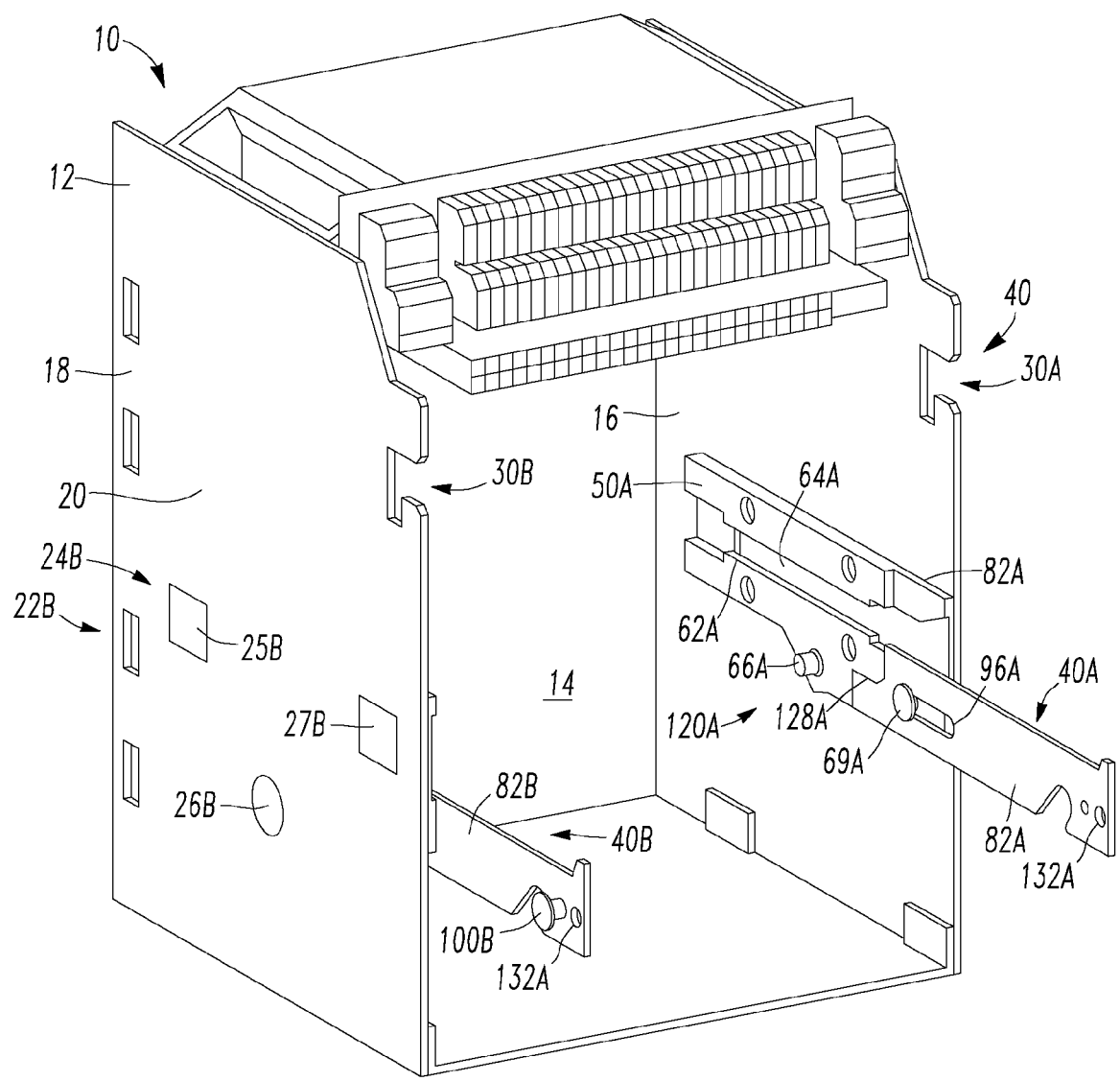
FIG. 4 is an isometric view of a housing assembly with the extension rails in a second position.
Figure 5:
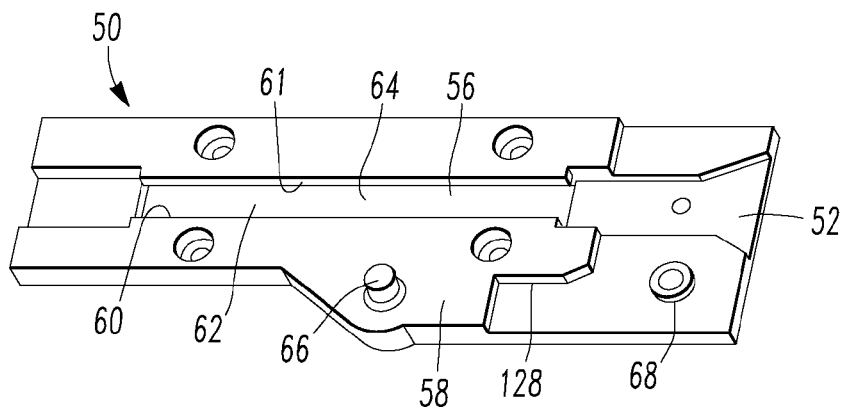
FIG. 5 is an isometric view of a support rail assembly.
Figure 6:
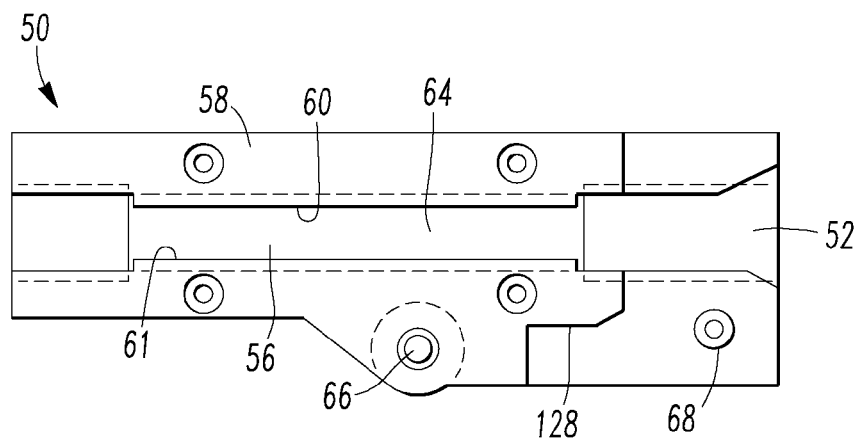
FIG. 6 is an interior surface side view of a support rail assembly.
Figure 7:
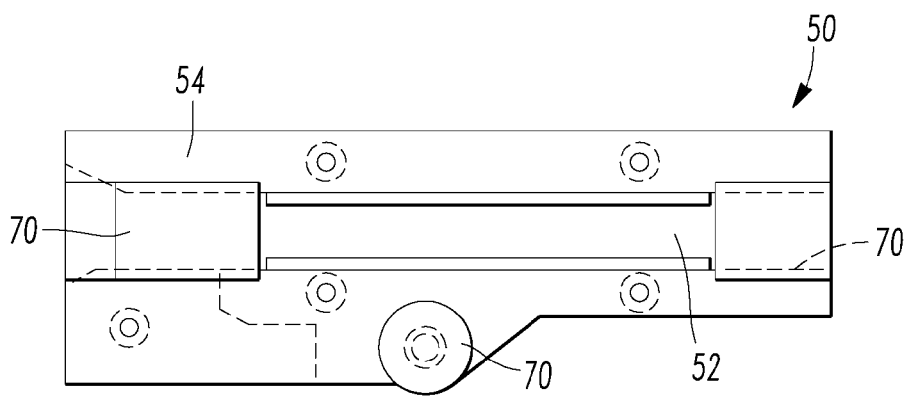
FIG. 7 is an exterior surface side view of a support rail assembly.

As shown in FIGS. 1-4, a housing assembly 10 for an electrical switching apparatus (not shown) includes a plurality of sidewalls 12 defining an enclosed space 14. Typically, the plurality of sidewalls 12 include six sidewalls disposed in a rectangular box-like configuration. It is noted that a front sidewall, which may be a door or a removable sidewall, is not shown. Such a front sidewall is well known in the art. Preferably, the housing assembly 10 has two lateral sidewalls, a right sidewall 16 and a left sidewall 18.

Shown in the figures, the support rail and extension rail assembly 40 includes two mirror image components. That is, a first support rail and extension rail assembly 40A is coupled to the housing assembly right sidewall 16 and a second support rail and extension rail assembly 40B is coupled to the housing assembly left sidewall 18. The first support rail and extension rail assembly 40A and the second support rail and extension rail assembly 40B are positioned at generally the same vertical location within the housing assembly 10. Similarly, the right sidewall 16 and left sidewall 18 are, generally, mirror images of each other. Accordingly, the following description shall address a single lateral sidewall of the housing assembly 10 and the associated support rail and extension rail assembly 40, however, it is understood that a second, mirror image support rail and extension rail assembly 40 coupled to a mirror image sidewall is also part of the invention. In the figures, those components associated with the first support rail and extension rail assembly 40A and the housing assembly right sidewall 16 shall be followed by the letter "A," while the second support rail and extension rail assembly 40B and the housing assembly left sidewall 18 shall be followed by the letter "B." It is further understood that similar reference numbers refer to similar components on opposing assemblies.

As shown, a lateral sidewall 16, 18 includes a generally flat body 20 having a plurality of openings 22 therethrough. The plurality of openings 22 includes a number of fastener openings and slots typically structured to couple the housing assembly sidewalls 12 to each other. The plurality of openings 22 further includes a plurality of mounting openings 24. Preferably, there are three mounting openings 25, 26, 27. The mounting openings 25, 26, 27 have a larger cross-sectional area than a typical fastener opening and, preferably, have a cross-sectional area that is greater than about 0.78 in.$^2$ and may have a cross-sectional area that is about 1.48 in.$^2$ Preferably, the total cross-sectional area for the protrusions is about 3.45 in.$^2$ A lateral sidewall 16, 18 further includes an L-shaped cutout 30. The L-shaped cutout 30 includes a horizontal portion 32 and a vertical portion 34. The horizontal portion 32 extends to the forward edge of the left sidewall 18. That is, the horizontal portion 32 is open at the forward edge of the left sidewall 18. The horizontal portion 32 and the vertical portion 34 meet at a vertex 36. The vertical portion 34 extends downwardly from the horizontal portion 32 at the vertex 36.

The support rail and extension rail assembly 40 includes a support rail assembly 50 and an extension rail assembly 80. The support rail assembly 50 has a base plate 52 with a first, exterior surface 54 and a second interior surface 56. The support rail assembly base plate interior surface 56 includes an interior surface protrusion 58. The support rail assembly base plate interior surface protrusion 58 has at least one horizontal edge 60 structured to act as a rail surface 62. In another embodiment, the support rail assembly base plate interior surface protrusion at least one horizontal edge 60 includes an additional, opposing horizontal edge 61. Thus, the two horizontal edges 60, 61 define a channel 64 therebetween. As is known in the art, an electrical switching apparatus will have one or more rollers or wheels structured to roll over the rail surface 62.

The support rail assembly base plate interior surface protrusion 58 further includes an inwardly extending levering mechanism lug 66. The levering mechanism lug 66 is a rigid point to which a levering mechanism may be attached. Preferably, the levering mechanism lug 66 is a short, wide cylinder. The support rail assembly base plate interior surface 56 also includes an extension rail pivotal mounting 68. The support rail assembly extension rail pivotal mounting 68 is structured to pivotally support an extension rail 82 (described below). Preferably, the support rail assembly extension rail pivotal mounting 68 has a cylindrical body to which a trap, such as a wide, flat disk 69 may be coupled. As shown, and for the reasons set forth below, the support rail assembly extension rail pivotal mounting 68 is preferably disposed at a vertical location that is below the support rail assembly base plate interior surface protrusion rail surface 62.

The support rail assembly base plate exterior surface 54 includes a plurality of protrusions 70 structured to engage the sidewall plurality of mounting openings 25, 26, 27. That is, the support rail assembly base plate exterior surface plurality of protrusions 70 are sized, shaped, and positioned to fit snuggly within the mounting openings 25, 26, 27. In this configuration, the support rail assembly base plate 52 may be coupled to the associated lateral sidewall 16, 18 by inserting the support rail assembly base plate exterior surface plurality of protrusions 70 into the mounting openings 25, 26, 27. The support rail assembly base plate 52 may be further secured by fasteners (not shown). The support rail assembly base plate exterior surface plurality of protrusions 70, due to their fit within the mounting openings 25, 26, 27, are structured to transfer any load applied to the support rail assembly 50 to the housing assembly 10.

Both the support rail assembly base plate interior surface protrusion 58, the support rail assembly base plate exterior surface plurality of protrusions 70, the levering mechanism lug 66 and the support rail assembly extension rail pivotal mounting 68 are, preferably, unitary with the support rail assembly base plate 52. More preferably, the support rail assembly base plate interior surface protrusion 58, the support rail assembly base plate exterior surface plurality of protrusions 70, the levering mechanism lug 66, and the support rail assembly extension rail pivotal mounting 68 are cast elements which are cast with the support rail assembly base plate 52.

The extension rail assembly 80 includes an extension rail 82 having an elongated body 84 with a first end 86, a medial portion 88, a second end 90, an upper rail surface 92, and an elongated slot 94 therein. The slot 94 has a first medial end 96 and a second distal end 98. The slot distal end 98 is closer to the body second end 90 than to the body medial portion 88. The extension rail 82 is pivotally coupled to the support rail assembly extension rail pivotal mounting 68. That is, the support rail assembly extension rail pivotal mounting 68 extends through the extension rail elongated slot 94. The extension rail 82 is maintained on the support rail assembly extension rail pivotal mounting 68 by the flat disk 69. The extension rail 82 further includes a lateral extension 100. The lateral extension 100 is, preferably, a cylindrical post 102 having a distal cap 104. The lateral extension 100 is sized to fit within, that is, pass through, the L-shaped cutout 30. The extension rail 82 further includes a finger notch 110. The finger notch 110 is disposed adjacent to the extension rail body first end 86. The finger notch 110 is sized to accommodate the gloved hand of a user who is wearing electrically protective gloves and, preferably, has a width of about 0.75 to 1.0 inch.

In this configuration, the extension rail 82 is structured to move between a first position, an intermediate position, and a second position. In the first position, shown in FIG. 1, the extension rail body 84 extends generally vertically with the support rail assembly extension rail pivotal mounting 68 located at the slot first medial end 96 and the lateral extension 100 is disposed at the lower end of the L-shaped cutout vertical portion 34. In the intermediate position, shown in FIG. 2, the extension rail body 84 has been moved generally vertically with the support rail assembly extension rail pivotal mounting 68 located at the slot second distal end 98 and the lateral extension 100 is now disposed at the vertex 36 of the L-shaped cutout 30. From this position, the extension rail body 84 may be pivoted into the second, horizontal position as the lateral extension 100 passes through the L-shaped cutout horizontal portion 32 and forward beyond the housing assembly lateral sidewall 16, 18. The extension rail body 84 in the horizontal position abuts the support rail assembly base plate 52.

More specifically, the support rail assembly base plate 52 includes a positioning device 120 structured to maintain the extension rail 82 in the second position. That is, the extension rail body second end 90 is structured to engage the support rail assembly base plate interior surface protrusion 58. Preferably, the support rail assembly base plate interior surface protrusion 58 includes a recess 122 sized and positioned to accommodate the extension rail body second end 90. Further, in a preferred embodiment, the extension rail body second end 90 is shaped to allow the extension rail body second end 90 to move past the support rail assembly base plate interior surface protrusion 58. This is most easily accomplished having an indentation 124 in the extension rail body second end 90 at the upper rail surface 92. Preferably, the indentation 124 includes a generally flat surface 126 that is generally parallel to the upper rail surface 92. Similarly, the recess 122 preferably includes a downwardly facing stop edge 128 that extends generally horizontally. Thus, when the indentation flat surface 126 abuts the recess stop edge 128, the extension rail 82 is in the horizontal second position. Further, the support rail assembly extension rail pivotal mounting 68 is positioned so that, when the extension rail 82 is in the second position, the upper rail surface 92 is generally aligned with the support rail assembly base plate interior surface protrusion rail surface 62.

Further in this configuration, the support rail and extension rail assembly 40 may be adapted to include a locking assembly 130. The locking assembly 130 is structured to prevent the extension rail 82 from moving from the first position to the intermediate position. The locking assembly 130 includes an opening 132 at the extension rail body first end 86 and a removable padlock 134. The locking assembly opening 132 is disposed immediately adjacent to, but does not breach, the edge at the extension rail body first end 86. Thus, when the extension rail 82 is in the first position and the padlock 134 is coupled to the first extension rail 82 at the extension rail locking assembly opening 132, and when the first extension rail 82 is moved from the first position toward the intermediate position, the padlock 134 engages a horizontal edge of the L-shaped cutout 30 and prevents the extension rail 82 from moving from the first position to the intermediate position. With the extension rail 82A, 82B locked into the first positions, no electrical switching apparatus may be moved into, or out from, the housing assembly 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A support rail and extension rail assembly for an electrical switching apparatus housing assembly, said electrical switching apparatus housing assembly defining an enclosed space and having a right sidewall and a left sidewall, said support rail and extension rail assembly comprising:

a first support rail assembly structured to be coupled to the interior surface of said right sidewall, said first support rail assembly having a base plate with a first, exterior surface and a second, interior surface;

said first support rail assembly base plate interior surface includes a extension rail pivotal mounting, said first support rail assembly extension rail pivotal mounting structured to pivotally support an extension rail;

said first support rail assembly base plate interior surface includes a positioning device structured to maintain a first extension rail in a second position;

a first extension rail having an elongated body with a first end, a medial portion, a second end, and an upper rail surface, said first extension rail body having an elongated slot therein, said slot having a first medial end and a second distal end, said slot distal end being closer to said body second end than said body medial portion;

said first extension rail pivotally coupled to said first support rail assembly extension rail pivotal mounting with said first support rail assembly extension rail pivotal mounting extending through said first extension rail elongated slot;

wherein said first extension rail moves between a first position, an intermediate position and a second position;

wherein when said first extension rail is in said first position, said first extension rail extends generally vertically with said first support rail assembly extension rail pivotal mounting disposed adjacent to said first medial end, when said first extension rail is in said intermediate position, said first extension rail extends generally vertically with said first support rail assembly extension rail pivotal mounting disposed adjacent to said slot distal end, and when said first extension rail is in said second position, said first extension rail extends generally horizontally with said first support rail assembly extension rail pivotal mounting disposed adjacent to said slot distal end;

a second support rail assembly structured to be coupled to the interior surface of said left sidewall, said second support rail assembly having a base plate with a first, exterior surface and a second interior surface;

said second support rail assembly base plate interior surface includes a extension rail pivotal mounting, said second support rail assembly extension rail pivotal mounting structured to pivotally support an extension rail;

said second support rail assembly base plate interior surface includes a positioning device structured to maintain a second extension rail in second position;

a second extension rail having an elongated body with a first end, a medial portion, a second end, and an upper rail surface, said second extension rail body having an elongated slot therein, said slot having a first medial end and a second distal end, said slot distal end being closer to said body second end than said body medial portion;

said second extension rail pivotally coupled to said second support rail assembly extension rail pivotal mounting with said second support rail assembly extension rail pivotal mounting extending through said second extension rail elongated slot;

wherein said second extension rail moves between a first position, an intermediate position and a second position; and wherein when said second extension rail is in said first position, said second extension rail extends generally vertically with said second support rail assembly extension rail pivotal mounting disposed adjacent to said first medial end, when said second extension rail is in said intermediate position, said second extension rail extends generally vertically with said second support rail assembly extension rail pivotal mounting disposed adjacent to said slot distal end, and when said second extension rail is in said second position, said second extension rail extends generally horizontally with said second support rail assembly extension rail pivotal mounting disposed adjacent to said slot distal end.

2. The support rail and extension rail assembly of claim 1 wherein:

said first support rail assembly base plate interior surface positioning device includes said first support rail assembly base plate interior surface having an interior surface protrusion, said first support rail assembly base plate interior surface protrusion having a recess, said recess structured to accommodate said first extension rail and positioned so that when said first extension rail abuts said recess, said first extension rail is in said second position; and said second support rail assembly base plate interior surface positioning device includes said second support rail assembly base plate interior surface having an interior surface protrusion, said second support rail assembly base plate interior surface protrusion having a recess, said recess structured to accommodate said second extension rail and positioned so that when said second extension rail abuts said recess, said second extension rail is in said second position.

3. The support rail and extension rail assembly of claim 2 wherein:

said first support rail assembly base plate interior surface protrusion recess includes a generally horizontal stop edge;

said first rail extension body second end has an indentation, said indentation having a generally flat surface that is generally parallel to the first rail extension upper rail surface;

said second support rail assembly base plate interior surface protrusion recess includes a generally horizontal stop edge; and said second rail extension body second end has an indentation, said indentation having a generally flat surface that is generally parallel to the second rail extension upper rail surface.

4. The support rail and extension rail assembly of claim 1 wherein said electrical switching apparatus housing assembly right sidewall and a left sidewall each have an L-shaped cutout, each said cutout having a generally horizontal portion extending from a front edge of the associated sidewall and a generally vertical portion extending downwardly from the interior end of said horizontal portion, each said cutout horizontal portion and each said cutout vertical portion meeting at a vertex, each said cutout disposed adjacent to a support rail assembly extension rail first end when said support rail assembly extension rail is in said first position, and wherein:

said first support rail assembly extension rail having a lateral extension, said lateral extension sized to fit within said right sidewall L-shaped cutout;

wherein, when said first support rail assembly extension rail is in said first position, said first support rail assembly extension rail lateral extension is disposed in said right sidewall cutout adjacent to the lower end of said cutout vertical portion, when said first support rail assembly extension rail is in said intermediate position, said first support rail assembly extension rail lateral extension is disposed at said right sidewall cutout vertex, and as said first support rail assembly extension rail moves to said second position, said first support rail assembly extension rail lateral extension passes out of said cutout via said right sidewall cutout horizontal portion at said right sidewall front edge;

said second support rail assembly extension rail having a lateral extension, said lateral extension sized to fit within said left sidewall L-shaped cutout; and wherein, when said second support rail assembly extension rail is in said first position, said second support rail assembly extension rail lateral extension is disposed in said left sidewall cutout adjacent to the lower end of said cutout vertical portion, when said second support rail assembly extension rail is in said intermediate position, said second support rail assembly extension rail lateral extension is disposed at said left sidewall cutout vertex, and as said second support rail assembly extension rail moves to said second position, said second support rail assembly extension rail lateral extension passes out of said left sidewall cutout via said cutout horizontal portion at said left sidewall front edge.

5. A housing assembly for an electrical switching apparatus comprising:

a plurality of sidewalls coupled together to define an enclosed space, said sidewalls including a right sidewall and a left sidewall, said right sidewall and said left sidewall each having an interior surface and an exterior surface;

said right sidewall having an L-shaped cutout, said cutout having a generally horizontal portion extending from a front edge of the right sidewall and a generally vertical portion extending downwardly from the interior end of said horizontal portion, each said cutout horizontal portion and each said cutout vertical portion meeting at a vertex;

a first support rail assembly structured to be coupled to the interior surface of said right sidewall, said first support rail assembly having a base plate with a first, exterior surface and a second interior surface, said first support rail assembly base plate interior surface includes an extension rail pivotal mounting, said first support rail assembly extension rail pivotal mounting structured to pivotally support an extension rail;

a first extension rail having an elongated body with a first end, a medial portion, a second end, and a lateral extension, said lateral extension sized to fit within said right sidewall L-shaped cutout, said first extension rail body having an elongated slot therein, said slot having a first medial end and a second distal end, said slot distal end being closer to said body second end than said body medial portion, said first extension rail pivotally coupled to said first support rail assembly extension rail pivotal mounting with said first support rail assembly extension rail pivotal mounting extending through said first extension rail elongated slot, wherein said first extension rail moves between a first position, an intermediate position and a second position, and wherein when said first extension rail is in said first position, said first extension rail extends generally vertically with said first support rail assembly extension rail pivotal mounting disposed adjacent to said first medial end, when said first extension rail is in said intermediate position, said first extension rail extends generally vertically with said first support rail assembly extension rail pivotal mounting disposed adjacent to said slot distal end, and when said first extension rail is in said second position, said first extension rail extends generally horizontally with said first support rail assembly extension rail pivotal mounting disposed adjacent to said slot distal end;

wherein, when said first support rail assembly extension rail is in said first position, said first support rail assembly extension rail lateral extension is disposed in said right sidewall cutout adjacent to the lower end of said cutout vertical portion, when said first support rail assembly extension rail is in said intermediate position, said first support rail assembly extension rail lateral extension is disposed at said right sidewall cutout vertex, and as said first support rail assembly extension rail moves to said second position, said first support rail assembly extension rail lateral extension passes out of said right sidewall cutout via said cutout horizontal portion at said right sidewall front edge;

said left sidewall having an L-shaped cutout, said cutout having a generally horizontal portion extending from a front edge of the left sidewall and a generally vertical portion extending downwardly from the interior end of said horizontal portion, each said cutout horizontal portion and each said cutout vertical portion meeting at a vertex;

a second support rail assembly structured to be coupled to the interior surface of said left sidewall, said second support rail assembly having a base plate with a first, exterior surface and a second interior surface, said second support rail assembly base plate interior surface includes an extension rail pivotal mounting, said second support rail assembly extension rail pivotal mounting structured to pivotally support an extension rail;

a second extension rail having an elongated body with a first end, a medial portion, a second end, and a lateral extension, said lateral extension sized to fit within said left sidewall L-shaped cutout, said second extension rail body having an elongated slot therein, said slot having a first medial end and a second distal end, said slot distal end being closer to said body second end than said body medial portion, said second extension rail pivotally coupled to said second support rail assembly extension rail pivotal mounting with said second support rail assembly extension rail pivotal mounting extending through said second extension rail elongated slot, wherein said second extension rail moves between a first position, an intermediate position and a second position, and wherein when said second extension rail is in said first position, said second position extends generally vertically with said second support rail assembly extension rail pivotal mounting disposed adjacent to said slot medial end, when said second extension rail is in said intermediate position, said second support rail assembly extension rail extends generally vertically with said second support rail assembly extension rail pivotal mounting disposed adjacent to said slot distal end, and when said second extension rail is in said second position, said second support rail assembly extension rail extends generally horizontally with said second support rail assembly extension rail pivotal mounting disposed adjacent to said slot distal end; and wherein, when said second support rail assembly extension rail is in said first position, said second support rail assembly extension rail lateral extension is disposed in said left sidewall cutout adjacent to the lower end of said cutout vertical portion, when said second support rail assembly extension rail is in said intermediate position, said second support rail assembly extension rail lateral extension is disposed at said left sidewall cutout vertex, and as said second support rail assembly extension rail moves to said second position, said second support rail assembly extension rail lateral extension passes out of said left sidewall cutout via said cutout horizontal portion at said left sidewall front edge.

6. The housing assembly of claim 5 wherein:
said first extension rail includes a locking assembly, said first extension rail locking assembly structured to prevent said first extension rail from moving from said first position to said intermediate position; and
said second extension rail includes a locking assembly, said second extension rail locking assembly structured to prevent said second extension rail from moving from said first position to said intermediate position.

7. The housing assembly of claim 6 wherein:
said first extension rail locking assembly includes an opening at said first extension rail body first end and a padlock;
said first extension rail locking assembly opening positioned so that, when said first extension rail is in said first position, said first extension rail locking assembly opening is disposed at said right sidewall cutout vertex;
wherein, when first extension rail is in said first position and said padlock is coupled to said first extension rail at said first extension rail locking assembly opening, and when said first extension rail is moved from said first position toward said intermediate position, said padlock engages a horizontal edge of said right sidewall L-shaped cutout and prevents said first extension rail from moving from said first position to said intermediate position;
said second extension rail locking assembly includes an opening at said second extension rail body first end and a padlock;
said second extension rail locking assembly opening positioned so that, when said second extension rail is in said first position, said second extension rail locking assembly opening is disposed at said left sidewall cutout vertex; and wherein, when second extension rail is in said first position and said padlock is coupled to said second extension rail at said second extension rail locking assembly opening, and when said second extension rail is moved from said first position toward said intermediate position, said padlock engages a horizontal edge of said left sidewall L-shaped cutout and prevents said second extension rail from moving from said first position to said intermediate position.

8. A housing assembly for an electrical switching apparatus comprising:
a plurality of sidewalls coupled together to define an enclosed space, said sidewalls including a right sidewall and a left sidewall, said right sidewall and said left sidewall each having an interior surface and an exterior surface;
said right sidewall having an L-shaped cutout, said cutout having a generally horizontal portion extending from a front edge of the right sidewall and a generally vertical portion extending downwardly from the interior end of said horizontal portion, each said cutout horizontal portion and each said cutout vertical portion meeting at a vertex;
a first support rail assembly structured to be coupled to the interior surface of said right sidewall, said first support rail assembly having a base plate with a first, exterior surface and a second interior surface, said first support rail assembly base plate interior surface includes an extension rail pivotal mounting, said first support rail assembly extension rail pivotal mounting structured to pivotally support an extension rail;
a first extension rail having an elongated body with a first end, a medial portion, a second end, and a lateral extension, said lateral extension sized to fit within said right sidewall L-shaped cutout, said first extension rail body having an elongated slot therein, said slot having a first medial end and a second distal end, said slot distal end being closer to said body second end than said body medial portion, said first extension rail pivotally coupled to said first support rail assembly extension rail pivotal mounting with said first support rail assembly extension rail pivotal mounting extending through said first extension rail elongated slot, wherein said first extension rail moves between a first position and an intermediate position and wherein when said first extension rail is in said first position, said first extension rail extends generally vertically with said first support rail assembly extension rail pivotal mounting disposed adjacent to said first medial end, when said first extension rail is in said intermediate position, said first extension rail extends generally vertically with said first support rail assembly extension rail pivotal mounting disposed adjacent to said slot distal end;
wherein, when said first support rail assembly extension rail is in said first position, said first support rail assembly extension rail lateral extension is disposed in said right sidewall cutout adjacent to the lower end of said cutout vertical portion, when said first support rail assembly extension rail is in said intermediate position, said first support rail assembly extension rail lateral extension is disposed at said right sidewall cutout vertex;
said left sidewall having an L-shaped cutout, said cutout having a generally horizontal portion extending from a front edge of the left sidewall and a generally vertical portion extending downwardly from the interior end of said horizontal portion, each said cutout horizontal portion and each said cutout vertical portion meeting at a vertex;

a second support rail assembly structured to be coupled to the interior surface of said left sidewall, said second support rail assembly having a base plate with a first, exterior surface and a second interior surface, said second support rail assembly base plate interior surface includes an extension rail pivotal mounting, said second support rail assembly extension rail pivotal mounting structured to pivotally support an extension rail;

a second extension rail having an elongated body with a first end, a medial portion, a second end, and a lateral extension, said lateral extension sized to fit within said left sidewall L-shaped cutout, said second extension rail body having an elongated slot therein, said slot having a first medial end and a second distal end, said slot distal end being closer to said body second end than said body medial portion, said second extension rail pivotally coupled to said second support rail assembly extension rail pivotal mounting with said second support rail assembly extension rail pivotal mounting extending through said second extension rail elongated slot, wherein said second extension rail moves between a first position and an intermediate position, and wherein when said second extension rail is in said first position, said second position extends generally vertically with said second support rail assembly extension rail pivotal mounting disposed adjacent to said slot medial end, when said second extension rail is in said intermediate position, said second support rail assembly extension rail extends generally vertically with said second support rail assembly extension rail pivotal mounting disposed adjacent to said slot distal end;

wherein, when said second support rail assembly extension rail is in said first position, said second support rail assembly extension rail lateral extension is disposed in said left sidewall cutout adjacent to the lower end of said cutout vertical portion, when said second support rail assembly extension rail is in said intermediate position, said second support rail assembly extension rail lateral extension is disposed at said left sidewall cutout vertex;

said first extension rail includes a locking assembly, said first extension rail locking assembly structured to prevent said first extension rail from moving from said first position to said intermediate position; and said second extension rail includes a locking assembly, said second extension rail locking assembly structured to prevent said second extension rail from moving from said first position to said intermediate position; said first extension rail locking assembly includes an opening at said first extension rail first end and a padlock;

said first extension rail locking assembly opening positioned so that, when said first extension rail is in said first position, said first extension rail locking assembly opening is disposed at said right sidewall cutout vertex;

wherein, when first extension rail is in said first position and said padlock is coupled to said first extension rail at said first extension rail locking assembly opening, and when said first extension rail is moved from said first position toward said intermediate position, said padlock engages a horizontal edge of said right sidewall L-shaped cutout and prevents said first extension rail from moving from said first position to said intermediate position;

said second extension rail locking assembly includes an opening at said second extension rail first end and a padlock;

said second extension rail locking assembly opening positioned so that, when said second extension rail is in said first position, said second extension rail locking assembly opening is disposed at said left sidewall cutout vertex; and wherein, when second extension rail is in said first position and said padlock is coupled to said second extension rail at said second extension rail locking assembly opening, and when said second extension rail is moved from said first position toward said intermediate position, said padlock engages a horizontal edge of said left sidewall L-shaped cutout and prevents said second extension rail from moving from said first position to said intermediate position.

* * * * *